United States Patent [19]

Bunting

[11] Patent Number: 4,807,917

[45] Date of Patent: Feb. 28, 1989

[54] BOTTLE DEPALLETIZER TOOL

[75] Inventor: Kemp R. Bunting, Naperville, Ill.

[73] Assignee: Amoco Corporation, Chicago, Ill.

[21] Appl. No.: 102,000

[22] Filed: Sep. 25, 1987

[51] Int. Cl.$^4$ .......................... B66C 1/92; B66C 1/28
[52] U.S. Cl. ................................................. 294/87.24
[58] Field of Search .................. 294/87.24, 87.1, 87.2, 294/87.22, 87.24, 87.28, 100, 106, 118, 119; 414/32, 71

[56] References Cited

U.S. PATENT DOCUMENTS 2,655,402 10/1953 Johnson ............................ 294/87.24
2,747,915  5/1956 Mapes ............................... 294/87.24

Primary Examiner—James B. Marbert
Attorney, Agent, or Firm—Thomas W. Tolpin; William H. Magidson; Ralph C. Medhurst

[57] ABSTRACT

A manually operated tool has a spaced parallel pair of elongated flange members mounted on the jaws at the ends of two horizontally disposed tongs or calipers. Each of a pair of hand hold members is individually associated with a corresponding one of the tongs. Grip levers adjacent the hand holds selectively open or close the tongs and, therefore, move the flanges apart or together. The flanges may be placed over a row of substantially aligned necks of a row of bottles, even if some of the bottles are slightly misaligned. The grip levers are pulled to close the tongs and bring the flanges together, thereby gripping the necks of the bottles. To release the bottles, the grip levers are released. The flanges move apart under a spring bias to release the bottles. If more or fewer bottles are to be picked up, longer or shorter flanges may be substituted for each other. Also, since there is no position on the flanges which is dedicated to picking up a bottle, any suitable number of bottles may be accommodated at any positions along the length of the flange.

15 Claims, 3 Drawing Sheets

BOTTLE DEPALLETIZER TOOL

This invention relates to bottle handling and transporting tools and more particularly to tools primarily—but not exclusively—intended for use in a factory during further processing, such as unloading bottles from a pallet and loading them onto a conveyor, for example.

An example of a time when and place for use of the inventive tool is a plant for filling plastic bottles having necks with screw threads at the top. In a large plant, automated machinery pick up and deposit the empty bottles on a conveyor which carries them past a filling station and on to a packaging machine. In a somewhat smaller plant, a semi-automated machine may perform the same function under the manual control of the operator. In a very small plant, the conveyor may be completely hand fed, with no automated loading machinery. Cost considerations lead to the decision as to which of these approaches is best, for any given plant.

In between the semi-automated and the completely manual operations, there is yet another category where a manual operation is best, but where special tools may speed the operation and reduce the costs. This category is exemplified by a factory where the plastic bottles are delivered on pallets to a load station. Each pallet carries a plurality of layers or tiers of empty bottles, with each successive tier being separated from its neighboring tier by suitable separators, such as paper sheets. All bottles are oriented the same way in each tier, with their necks in alignment.

If a row of the bottles can be picked up at a single time and set upon a conveyor in alignment, without displacing or disorienting the bottles, there is a considerable savings. The number of bottles in each row may vary since some of the bottles may be a large or very large size, while other of the bottles may be a small or very small size. However, for purposes of explaining the invention, it will be convenient to describe rows of six bottles.

Nevertheless, it would be well if the tool design has such flexibility that it could easily be enlarged or reduced to pick-up more or less bottles in a single operation.

A prior art example of a bottle carrier of this general type is found in U.S. Pat. No. 1,974,255 (Herman F. Behrendt, inventor). This carrier is limited to a handle having dedicated gripping devices for carrying two bottles at specific locations relative to the handle. Also, the devices used to grip the bottles have to be very well aligned with the necks of the individual bottles since the devices are at specific points which are dedicated to a gripping of the bottles. It would be very difficult for the Behrendt device to pick-up an entire row of bottles, if one is slightly skewed and does not align with the dedicated position of the pick-up devices. By way of comparison, one embodiment of the inventive tool enables an operator to pick up and relocate approximately ninety bottles, per minute, even if the bottles are skewed somewhat.

Other U.S. patents showing the state of the bottle carrier art are: U.S. Pat. Nos. 237,711; 590,963; 2,051,481; 2,281,730; 2,337,243; and 3,144,269. One way or another each of these patents require the bottles to be pre-aligned or otherwise manipulated to a dedicated pick-up point in a manner which would preclude a transfer of approximately ninety or so bottles per minute.

Accordingly, an object of this invention is to provide new and improved bottle handling devices. Here, an object is to provide such a tool for use in situations where bottles arrive at a work station, stacked in substantially, but not necessarily, perfectly aligned rows. In this connection, an object is to pick up at least part, if not all, of a row of the aligned bottles, at a single time.

Another object is to provide a tool design with a capacity which may be increased or decreased merely by changing a part or two.

Still another object is to accomplish these objects by providing a relatively lightweight tool which does not contribute substantially to worker fatigue.

In keeping with an aspect of the invention, these and other objects are accomplished by a pair of spaced parallel flange members mounted on the ends of two horizontally disposed tongs. A bar with a pair of hand hold members has a grip lever adjacent each of the hand holds for selectively opening or closing the tongs. Therefore, these levers move the flanges apart or together. The open flanges may be placed over the aligned necks of a row of bottles, even if some of the bottles are slightly misaligned. The grip lever is pulled toward the hand hold to close the tongs and bring the flanges together, thereby gripping the necks of the bottles. The grip levers are released to release the bottles. Then, the flanges move apart to release the bottles. If fewer or more bottles are to be picked up simultaneously, shorter or longer flanges may be substituted for each other.

A preferred embodiment of the invention is shown in the attached drawings, wherein.

Figure 1:
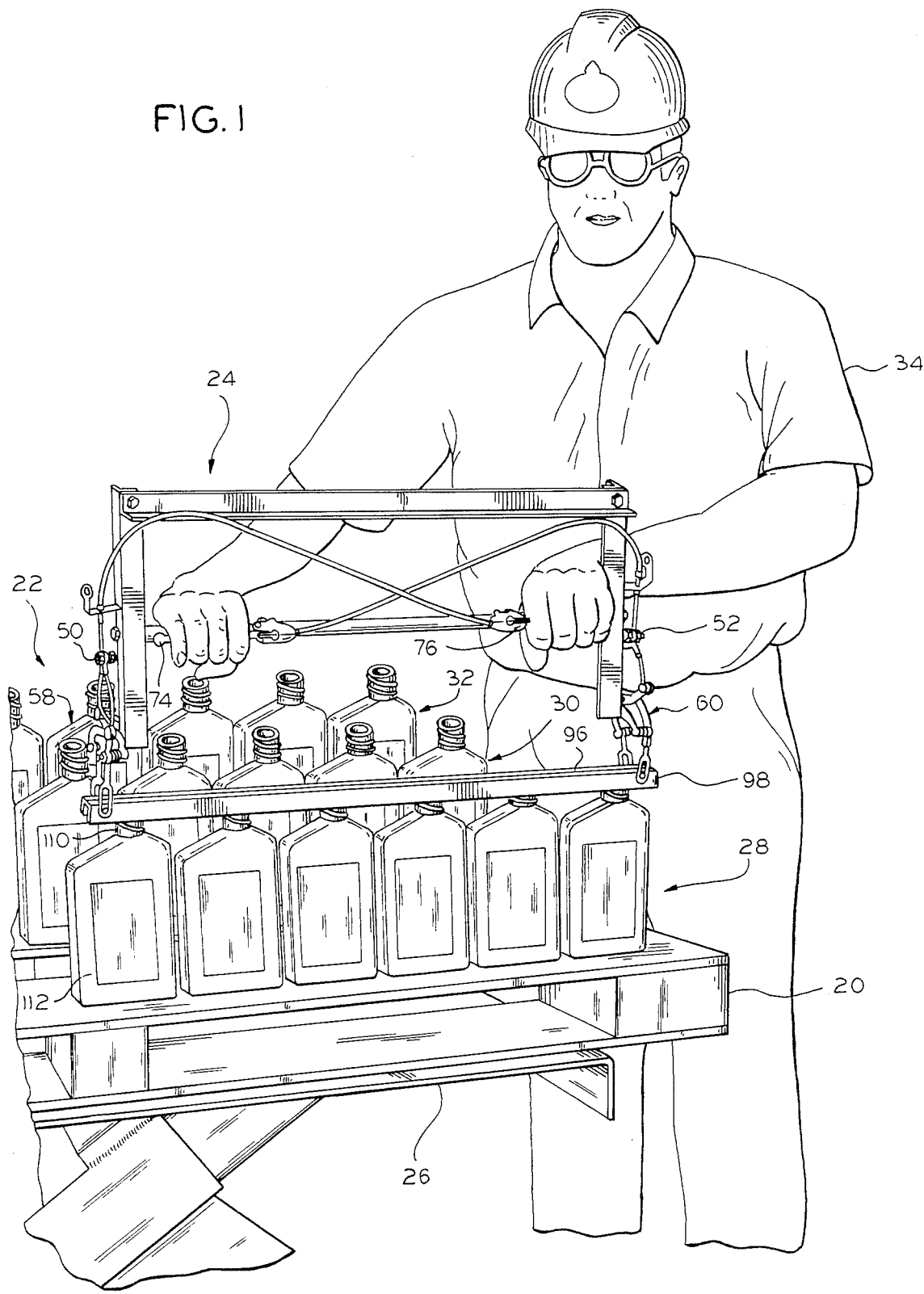
FIG. 1 is a perspective view portraying a worker using the inventive tool to pick up a row of bottles from a pallet.

The principal elements shown in FIG. 1 are a pallet 20, an array of plastic bottles or containers 22, and the inventive manually operable depalletizing tool 24. Pallet 20 is supported at a comfortable working level by any suitable support member 26, and preferably by a support which always holds the next row of bottles to be picked up at a comfortable working level. The depalletizing tool 24 provides a portable, sturdy, reliable bottle holder for grasping (holding), carrying and transporting bottles from one location to another.

It is not important how or why the array of bottles 22 reached the pallet 20. However, in one example, the bottles 22 are blow molded on an automatic machine which deposits its output in a plurality of spaced parallel, evenly arranged rows 28, 30, 32 until the pallet is filled. Then, a suitable sheet of paper 31 (FIG. 2) cardboard, or the like is placed over the top of the bottles and another tier 33 of bottles are deposited thereon. The process is repeated with many tiers of bottles being stacked upon the pallet 20.

When the pallet reaches the work station shown in FIG. 1, it is put on a support or workbench 26 which may elevate the pallet to a level where the row of bottles which is to be picked up is comfortable for the operator 34. As the bottles are removed and a complete tier is depleted, support 26 preferably—although not necessarily—raises the pallet to a level when the next tier of bottles is at a comfortable working level. In FIG. 1, all except the lowermost of the tiers have been removed. The worker is about to remove a first row of bottles 28 from the bottom tier which is resting directly upon the pallet.

As here shown, each row 28, 30, 32 contains six empty bottles which are ready to be filled. Therefore, the inventive tool 24 is shown as being equipped with flanges having a length which picks up six bottles simultaneously. If each row contained some other number of bottles, it might be preferable for the inventive tool 24 to be modified to pick-up that number. For example, the worker's ability to align the tool over a long row without knocking over one of the bottles might become a limiting factor. Thus, the tool may be adapted to pick up, say, a half, a third or a quarter of the bottles in a single row.

Figure 4:
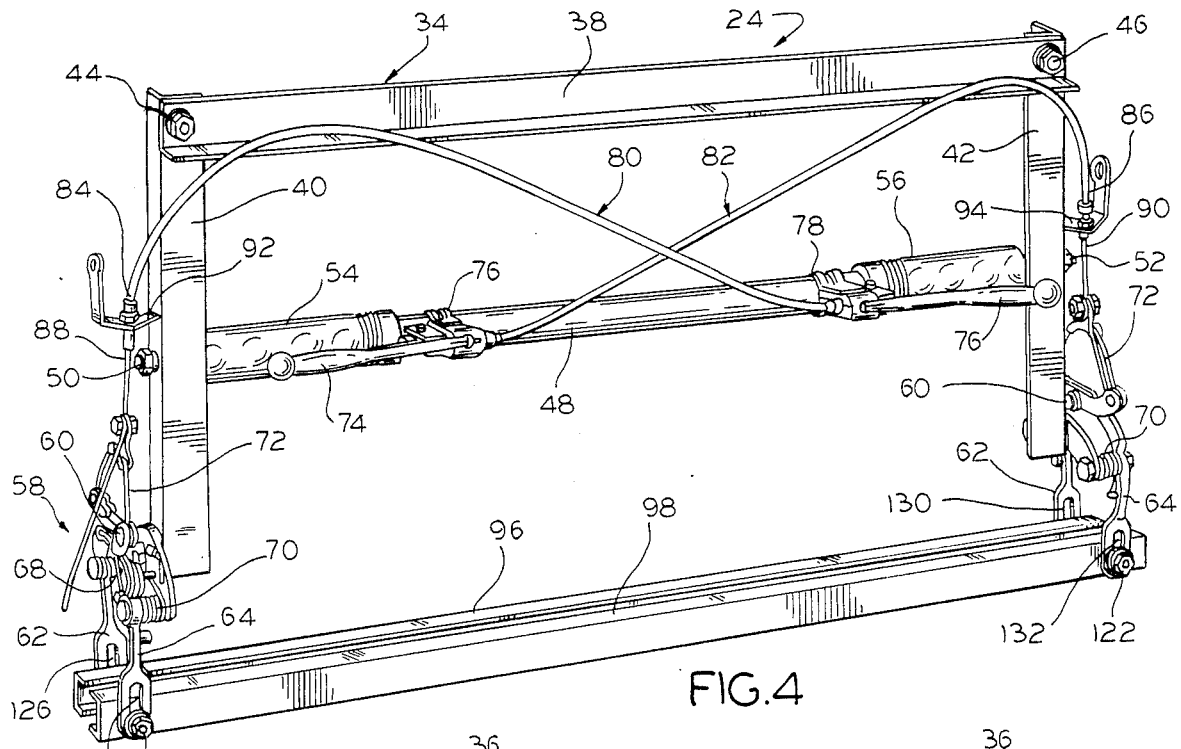
FIG. 4 is a perspective view showing the side of the inventive tool.
Figure 5:
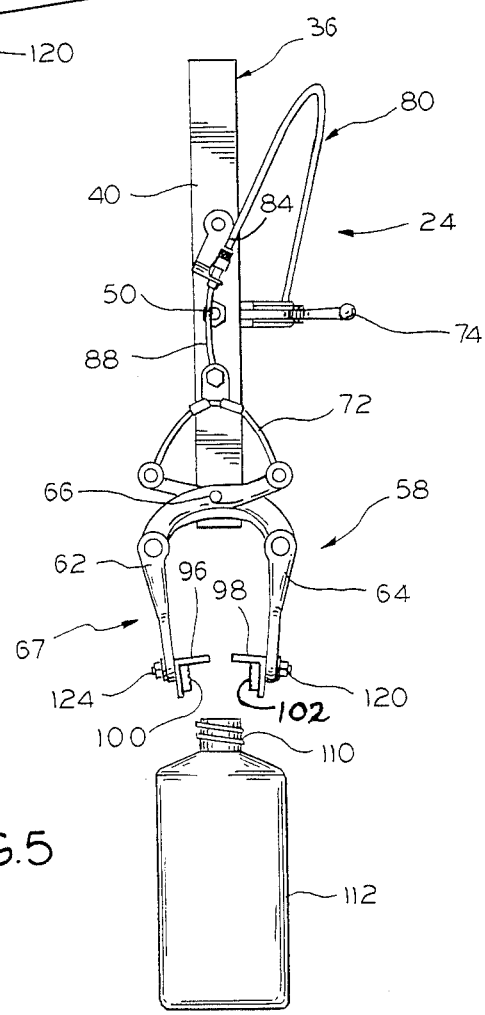
FIG. 5 is an end view elevation showing the inventive tool in an open condition.
Figure 6:
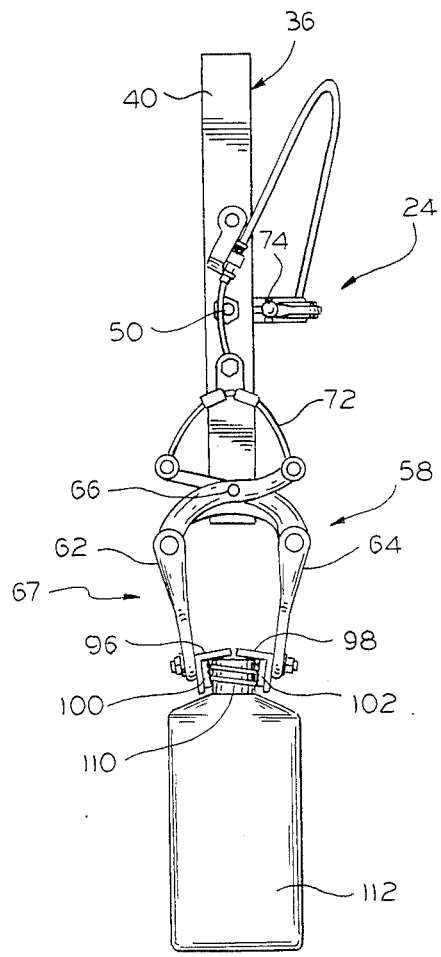
FIG. 6 is a similar end view showing the tool in a closed condition.

The details of the tool 24 are shown in FIGS. 4–6. A frame 36 includes a horizontal member 38 with two spaced parallel vertical members 40, 42 connected thereto, at opposing ends 44, 46 thereof. These connections are preferably made by bolts so that, if necessary, the tool may be made longer or shorter by changing the horizontal member 38.

Vertically displaced from horizontal bar 38, by a distance slightly less than approximately one half of the length of vertical members 40, 42, is a horizontal tube 48 containing a threaded rod having ends 50, 52 which are connected to the vertical members. The connections are such that members 38, 40, 42, 48 form a generally rectangular frame, with the lower halves of the vertical members 40, 42 being dependent therefrom. This way, enough of the weight is below the tube 48 so that the tool hangs downwardly under gravity and gives the worker an easily manipulated tool. Again, the tube 48 and the threaded rod 50, 52 may be made longer or shorter to enlarge or reduce the bottle lifting capacity of the tool.

A pair of spaced and aligned horizontal hand holds 54, 56 are positioned at comfortable positions near the opposite ends of the tube 48. These hand tools comprise cylindrical handles and may be made of a suitable elastomeric material, such as rubber or vinyl, for example. The distribution of weight throughout the tool is such that, when empty, the tool hangs under gravity from the hand holds, and yet is easy to manipulate in order to grasp a row of bottle necks.

A pair of tongs or calipers 58, 60 are individually associated with, depend from and are attached near the bottoms of the vertical members 40, 42. Each of these tongs or calipers includes a pair of arms which are hinged to pivot about approximately a midpoint 66 in order to provide a scissors action to open and close jaws 67 at the bottom of the arms. A pair of coiled springs 68, 70 (FIG. 4) normally bias the scissors action of the tongs 58, 60 and their jaws to an open position. A cable 72 (FIG. 5) bridges the upper ends of the tongs or calipers 58, 60. When this cable is pulled in a direction extending away from the pivot point 66, the tongs or calipers 58, 60 close against the bias of the springs 68, 70. When cable 72 is released, springs 68, 70 open the tongs or calipers and spread apart their jaws 67.

A grip lever 74, 76 is individually associated with each of the hand holds 54, 56, and is pivotally attached to the tube 48 at locations 76, 78 near the hand holds. Attached to each of the grip levers 74, 76 is a cable 80, 82 which extends to actuate a corresponding one of the tongs or calipers 58, 60. Each cable comprises an outer tubular sheath 84, 86 with an inner siding cable 88, 90. The distal ends of cables 80, 82 are anchored at 92, 94 to vertical members 40, 42. The distal ends of inner cables 88, 90 are connected to tong actuating cables 72. Therefore, when the grip levers 74, 76 are pulled, the tongs 58, 60 close jaws 67 as shown in FIG. 6. Conversely, when the grip levers 74, 76 are released, the tongs and their jaws open as shown in FIG. 5. This arrangement of hand holds, gripping lever, cable, and tongs is somewhat similar to well known caliper structures for applying brakes to the front wheel of a bicycle.

Attached to the lower extremities of the tongs 58, 60 and extending horizontally and parallel to frame member 38 and tube 48 is a grasping means in the form of a pair of elongated spaced parallel flanges 96, 98. The flanges are free of dedicated gripping positions so that they may grip any suitable number of bottles, even if they have minor misalignment.

More particularly, these flanges 96, 98 may have any convenient cross section such as the U-shape seen in FIG. 4 or the L-shape seen in FIGS. 5, 6. The inner surfaces of these flanges have inwardly facing bottleneck-engageable pads 100, 102, preferably running along the full length thereof. Therefore, when closed over the necks of the bottles, the pads will grip them. The pads may be made of an elastomer to deform somewhat around the bottle top and especially around their threaded end in order to grasp different sizes. In the preferred embodiment, the longitudinal inner surface of the flanges are straight and are not curved, indented or shaped complementary to the bottlenecks. In the alternative, the pads may have a front surface that has indentations which generally mesh into the threads on the neck.

The operation of the inventive tool should now be clear. The operator 34 (FIG. 1) holds the hand holds without gripping the levers 74, 76 and places open flanges 96, 98 over the necks of all bottles in row 28. As shown in FIGS. 4, 5, with the levers 74, 76 released (unoperated), the tongs 58, 60 are in their spring biased, open position. The jaws 67 are open and pads 100, 102 easily slip over neck 110 of bottle 112, and all over other bottlenecks in the row.

Then, the operator 34 (FIG. 1) grips the levers 74, 76 to pull cables 80, 82 and thereby close jaws 67 on the tongs 58, 60. More particularly, as shown in FIG. 6, gripping lever 74 is depressed or pulled in toward the hand hold to pull cable 50 and thereby close the tongs. The flanges 96, 98 close over the necks 110 of all of the bottles in row 28 (FIG. 1) so that the flanges can interlockingly engage and releasably grasp the bottlenecks 110.

Next the operator 34 (FIG. 3) lifts the tool 24, carrying all six bottles in row 28 to a conveyor 114, by way of example. There, the operator properly positions the bottles in row 28 upon the conveyor and then releases the grip levers 74, 76. The conveyor 114 removes the bottles to any suitable work stations (such as fill, cap, and package stations) while the operator returns to pick-up the next row 30 (FIG. 1) of bottles.

Of course, the conveyor 114 is only one example of when and why the invention may be used, which is given here for convenience of description. The invention may be used any time it is necessary to pick-up an aligned group of any objects which may be similar to the bottles shown in FIG. 1.

The specific example of FIG. 1 illustrates rows containing six bottles each. However, the rows may contain any other suitable lengths, measured either in the number of bottles or in the physical length of the rows. As long as the physical length of the row does not exceed the length of flanges 96, 100, it is irrelevant how many bottles are present since the flanges grip at any location and do not have any dedicated position where the bottle must be gripped.

Figure 2:
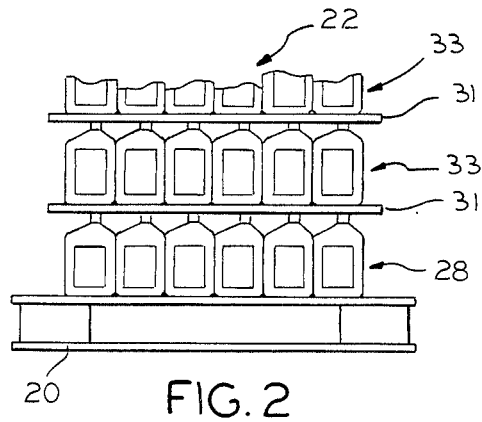
FIG. 2 shows a plurality of tiers of bottles stacked upon a pallet.
Figure 3:
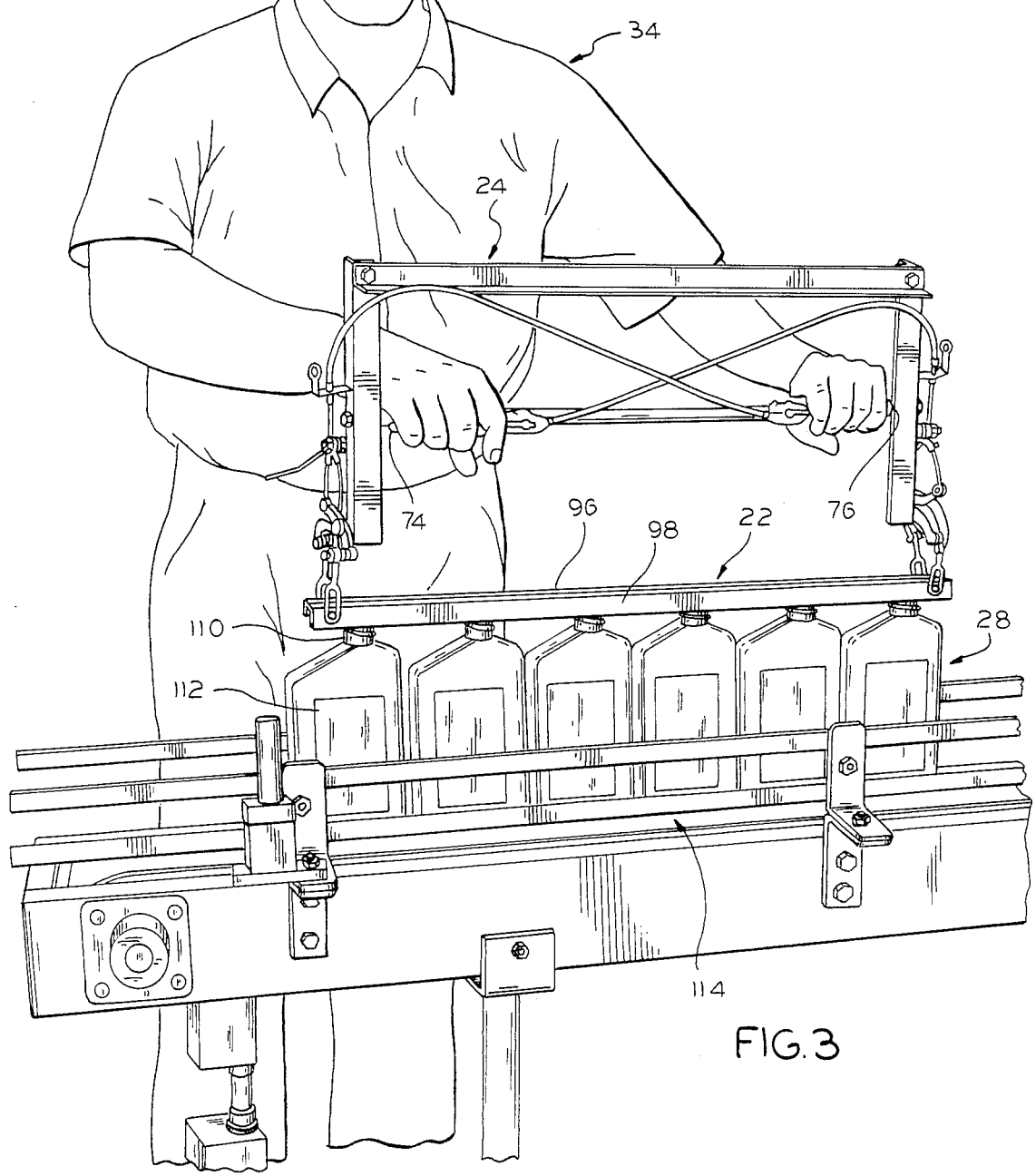
FIG. 3 is a view similar to FIG. 1 showing a worker depalletizing a row of bottles onto a conveyor.

If the physical length of a row of bottles is longer or shorter than that shown in FIGS. 1-3, the tool 24 may be made longer or shorter. Usually, it is only necessary to remove bolts 120, 122, 124 (FIG. 4) and to substitute longer (or shorter) flanges 96, 98. The slots 126, 128, 130, 132 are formed at the tips of the jaws 67 in order to enable the flanges to be accurately aligned with each other.

If the flanges become too long so that the tool is unwieldy, the hand holds 54, 54 may be moved further apart by removing bolts 44, 46, 50, 52 and substituting a longer horizontal member 38 and tube 48.

The advantages of the invention are that a worker may move a great number of bottles or similar objects, quickly and easily without an unduly tiring work day.

The inventive depalletizing tool has been tested at the lube oil plant at the Amoco Oil Refinery at Casper, Wyo. for use with conveyorized semi-automatic oil filling equipment. The inventive tool securely held, firmly grasped and repetitively carried rows of similar size plastic bottles from a bottle unloading area (work station) to a conveyor before the bottles were filled with motor oil. The inventive tool was dependable, efficient and effective.

Those who are skilled in the art will readily perceive how to modify the invention. Therefore, the appended claims are to be construed to cover all equivalent structures which fall within the true scope and spirit of the invention.

The claimed invention is:

1. A manually operated tool comprising a somewhat rectangular frame having substantially vertical members depending from substantially opposite ends of the frame; caliper action tong means attached at a pivot point to each of said depending members with said tongs in a substantially spaced parallel relationship and with jaws of said tongs in a substantially horizontally alignment; a pair of elongated spaced substantially parallel and opposing flanges extending between, attached to and moving with the jaws; said flanges being substantially free of dedicated positions for grasping objects; elastomer means substantially lining at least a portion of said flanges at confronting locations on said opposing flanges; and manually operated means for selectively opening and closing said jaws by pivoting them about said midpoints, whereby a substantially aligned row of objects may be grasped by said flanges regardless of minor deviations of the positions of said object within said aligned row.

2. A manually operated tool comprising a somewhat rectangular frame having substantially vertical members depending from substantially opposite ends of the frame, tong means attached to each of said depending members to provide substantially horizontally aligned jaws which open and close as said tong means are opened and closed, a pair of elongated spaced substantially parallel flanges attached to and moving with the jaws, said flanges being substantially free of dedicated positions for grasping objects, manually operated means for selectively opening and closing said jaws, whereby a substantially aligned row of objects may be grapsed by said flanges regardless of minor deviations of the positons of said object within said aligned row, said manually operated means comprising a pair of hand hold means associated with said frame, grip lever means positioned adjacent said hand hold means, and cable means extending from said grip lever means to said tong means for opening and closing said tong means.

3. The tool of claim 2 and inwardly facing bottle engageable pad means on confronting surfaces of said flanges for gripping necks of an aligned plurality of bottles.

4. The tool of claim 2 and spring bias means for normally urging said tongs to an open positon, said cable means pulling said tongs against said spring bias to a closed position, whereby a release of said grip levers causes said flanges to open under the urging of said spring bias means.

5. The tool of claim 2 wherein at least said flanges are replaceable in order to change the flange lengths to accommodate different loads.

6. A method of depalletizing empty bottles which are stored without confinement and in substantially aligned rows on a pallet, said method comprising the steps of:
  (a) delivering a pallet carrying a plurality of bottles to a first work station, said bottles being substantially aligned in a plurality of rows with a predetermined number of bottles in each row;
  (b) using a manual tool having substantially no dedicated lifting points to simultaneously fit over and grasp all bottles in a single row despite any minor misalignment thereof, said tool having spaced parallel flanges at least partially covered with bottle engaging elastomeric pads for grasping all of said bottles without necessarily requiring the bottles to be perfectly aligned;
  (c) lifting said tool to simultaneously transport all of the grasped bottles in a single and well aligned row while they are in the grip of said tool; and
  (d) depositing all of said grasped bottles as a unit in a second work station and releasing said grip, whereby said bottles appear in the same substantially well aligned order in said second work station.

7. The method of claim 6 and the further step of selecting and installing on said tool gripping flanges having lengths corresponding to the lengths of said rows, said flanges being free of positions which are specifically dedicated to picking up objects, whereby said flanges may be adapted to pick up rows containing different numbers of bottles.

8. A method of depalletizing empty bottles which are stored in substantially aligned rows on a pallet, said method comprising the steps of:
  (a) delivering a plurality of bottles to a first work station, said bottles being aligned in a plurality of rows with a predetermined number of bottles in each row;
  (b) using a manually operated tool to simultaneously fit over and grasp all bottles in a single row, (c) selecting and installing on said tool gripping flanges having lengths corresponding to the lengths of said rows, said flanges being free of positions which are specifically dedicated to picking up objects, whereby said flanges may be adapted to pick up rows containing different numbers of bottles;

(d) opening and closing a bottle grasping means responsive to a manual operation of a grip lever coupled to said flanges via a cable, said tool grasping all of said bottles without necessarily requiring the bottles to be perfectly aligned;

(e) lifting said tool to simultaneously transport all of the grasped bottles in a single row while they are in the grip of said tool; and (f) depositing all of said grasped bottles as a unit in a second work station and releasing said grip, whereby said bottles appear in the same aligned order in said second work station.

9. The method of claim 8 wherein said bottles on said pallet are stacked in tiers, each tier having substantially the same orientation of substantially aligned rows, and the further step of raising said pallet when all bottles in one tier are lifted off said pallet, whereby said bottles are always at the substantially the same height when they are lifted off said pallet.

10. The method of claim 8 and the added step of automatically conveying said bottles deposited in said step (f) away from said second work station.

11. A tool comprising means for supporting elongated spaced parallel grasping means which are free of positions that are individually dedicated to grasping specific objects whereby said grasping means may simultaneously grasp a variable number of individual items at any positions along the length thereof, means for supporting said grasping means including a spaced pair of separate and aligned hand holds positioned above said grasping means whereby said grasping means hangs down under gravity, a pivoted gripping lever adjacent each of said hand holds, means responsive to an operation of said gripping levers for opening and closing said grasping means, elastomer pad means lining confronting locations of at least a portion of said grasping means at confronting locations, and means responsive to an operation of said gripping levers for manually moving said grasping means from a first to a second location.

12. The tool of claim 11 and means for opening said grasping means wide enough to include said items even if there is a minor misalignment of said objects relative to said grasping means.

13. The tool of claim 11 wherein said tool has a balance which places said grasping means in a stable operating position regardless of whether said tool is or is not grasping said items.

14. A tool comprising means for supporting elongated spaced parallel grasping means which are free of positions that are individually dedicated to grasping specific objects whereby said grasping means may simultaneously grasp a variable number of individual items at substantially any position along the length thereof, said means for supporting said grasping means including a spaced pair of aligned hand holds positioned above said grasping means whereby said grasping means hangs down under gravity, said grasping means comprising a pair of flanges mounted on the jaws of a pair of spaced and aligned calipers, a gripping lever adjacent each of said hand holds, cable means responsive to said gripping lever for manually controlling said grasping means, each of said cable means extending from each of said gripping levers to a corresponding one of said calipers, and means responsive to an operation of said gripping levers for opening and closing said grasping means.

15. A manually operated tool for grasping and transporting bottles having necks, said tool comprising a somewhat rectangular frame having a pair of substantially vertical members, one of each such members depending from an individually associated one of substantially opposite ends of the frame, tong means attached to each of said depending members to provide substantially horizontally aligned jaws which open and close as said tong means are opened and closed, spring bias means for normally urging said tongs to an open position, a pair of elongated spaced substantially parallel flanges attached to and moving with the jaws, said flanges being substantially free of dedicated positions for grasping objects, inwardly facing bottle engageable pad means on confronting surfaces of said flanges for gripping necks of a substantially aligned plurality of bottles arranged in a row, manually operated means for selectively opening and closing said jaws, whereby said substantially aligned row of bottles may be grasped between said flanges regardless of minor deviations of the positions of said bottles within said row, said manually operated means comprising a pair of hand hold means associated with said frame, grip lever means positioned adjacent said hand hold means, and cable means extending from said grip lever means to said tong means for opening and closing said tong means, said cable means pulling said tongs against said spring bias means to a closed position, whereby a release of said grip lever means causes said flanges to open under the urging of said spring bias means to release said bottles.

* * * * *

UNITED STATES PATENT OFFICE
CERTIFICATE OF CORRECTION

Patent No. 4,807,917     Dated February 28, 1989

Inventor(s) Kemp R. Bunting

It is certified that error appears in the above-identified patent and that said Letters Patent is hereby corrected as shown below:

| Column | Line | |
|---|---|---|
| 6 | 43 | "necessarity" should read --necessarily-- |

Signed and Sealed this

Twenty-sixth Day of June, 1990

Attest:

HARRY F. MANBECK, JR.

*Attesting Officer*     *Commissioner of Patents and Trademarks*